(12) United States Patent
Daikuzono

(10) Patent No.: US 8,317,442 B2
(45) Date of Patent: Nov. 27, 2012

(54) VEHICLE CARGO AREA DIVIDER ASSEMBLY

(75) Inventor: Ryosuke Daikuzono, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 12/712,451

(22) Filed: Feb. 25, 2010

(65) Prior Publication Data

US 2011/0206474 A1 Aug. 25, 2011

(51) Int. Cl.
*B60P 7/08* (2006.01)
(52) U.S. Cl. ......... 410/140; 410/121; 410/129; 410/141
(58) Field of Classification Search .................. 410/121, 410/129, 130, 132, 140, 141, 142, 143, 144, 410/145; 52/586.2, 591.3; 224/42.33, 403, 224/404; 296/37.6; 220/530, 552, 532, 533
See application file for complete search history.

(56) References Cited

U.S. PATENT DOCUMENTS

| | | | |
|---|---|---|---|
| 4,595,246 A | 6/1986 | Bross | |
| 4,917,429 A | 4/1990 | Giger | |
| 4,958,876 A | 9/1990 | Diaco et al. | |
| 5,044,682 A | 9/1991 | Wayne | |
| 5,052,580 A | 10/1991 | Khoury | |
| 5,215,205 A | 6/1993 | Behlman | |
| 5,265,993 A * | 11/1993 | Wayne | 410/129 |
| 5,423,463 A | 6/1995 | Weeks | |
| 5,597,193 A | 1/1997 | Conner | |
| 5,603,439 A | 2/1997 | Pineda | |
| 5,931,632 A | 8/1999 | Dongilli et al. | |
| 6,138,883 A | 10/2000 | Jackson et al. | |
| 6,174,116 B1 | 1/2001 | Brand | |
| 6,206,624 B1 * | 3/2001 | Brandenburg | 410/132 |
| 6,688,821 B1 | 2/2004 | Snyder | |
| 6,779,956 B2 | 8/2004 | Strumolo et al. | |

* cited by examiner

*Primary Examiner* — Stephen Gordon
(74) *Attorney, Agent, or Firm* — Rankin, Hill & Clark LLP

(57) ABSTRACT

A vehicle cargo area divider assembly includes a vehicle cargo area having a plurality of walls defining at least one wall projection and at least one wall groove. The vehicle cargo area divider assembly further includes a plurality of partition members each having a first end defining a first end projection and at least one first end groove orthogonally oriented relative to the projection, and having a second end defining a second end groove. The first end projection of a first partition member of the plurality of partition members is alternately receivable in the at least one wall groove of the vehicle cargo area, in the at least one first end groove of at least one other partition member of the plurality of partition members, or in the second end groove of the at least one other partitioned member.

20 Claims, 4 Drawing Sheets

VEHICLE CARGO AREA DIVIDER ASSEMBLY

BACKGROUND

Exemplary embodiments herein generally relate to a vehicle cargo area divider assembly.

Vehicles include cargo areas that are often used to transport cargo. In the case of vehicles such as pick-up trucks having a cargo area, the cargo area can be open to atmosphere. The cargo carried in the cargo area can vary in size. When the cargo area is used for carrying relatively large items (e.g., appliances, furniture, motorcycles, etc.), it may be relatively easy to secure the items within the cargo area. In particular, securing of the item can be relatively easy if the item can be oriented such that the size of the item corresponds with the size of the cargo area.

However, the load carrying cargo area is often used to carry smaller items. Moreover, vehicles having load carrying cargo areas used in everyday use more frequently carry smaller items than the relatively larger items referenced above. Unfortunately, these smaller items (e.g., groceries, sports gear, clothing or other miscellaneous items) are typically not easily secured within the vehicle cargo area. As a result, smaller items can shift around within the cargo area and may become damaged unless the user spends extra time and effort to pack and/or secure the items.

Partition walls for use in conjunction with vehicle cargo areas are known. One such partition extends across the cargo area from wall to wall, but is relatively limited in dividing the cargo area into smaller compartments. Other known partition walls may divide the vehicle cargo area into somewhat smaller areas but the smaller area still is typically limited in the shape and size. Moreover, many of these other partition designs are complicated to manufacture and/or to use.

SUMMARY

According to one aspect, a vehicle cargo area divider assembly includes a vehicle cargo area having a plurality of walls defining at least one wall projection and at least one wall groove. The vehicle cargo area divider assembly further includes a plurality of partition members each having a first end defining a first end projection and at least one first end groove orthogonally oriented relative to the projection, and having a second end defining a second end groove. The first end projection of a first partition member of the plurality of partition members is alternately receivable in the at least one wall groove of the vehicle cargo area, in the at least one first end groove of at least one other partition member of the plurality of partition members, or in the second end groove of the at least one other partition member.

According to another aspect, a partition member for a vehicle cargo area divider assembly includes a first end defining a first end projection and at least one first end groove orthogonally oriented relative to the projection, and a second end defining a second end groove. The projection is received in a corresponding groove of another partition member or of a vertical wall of an associated vehicle cargo area. The at least one first end groove receives at least one corresponding projection of another partition member. The second end groove receives at least one corresponding projection of another partition member or of the cargo area wall.

According to still another aspect, a vehicle cargo area divider assembly having a plurality of matching partition members for dividing a vehicle cargo area includes a first partition member of the plurality of matching partition members having a first partition side and a second partition side. The first partition member has a first end surface extending between the first partition side and the second partition side at a first end of the first partition member and a second end surface extending between the first partition side and the second partition side at a second end of the first partition member. A first end projection extends from the first end surface. A pair of first end grooves are respectively defined in the first and second partition sides adjacent the first end surface. A depth of each of the pair of grooves is oriented approximately perpendicularly relative to a length of the first end projection. A second end groove is defined in the second end surface. A depth of the second end groove is generally parallel to the length of the first end projection.

DETAILED DESCRIPTION

Figure 1:
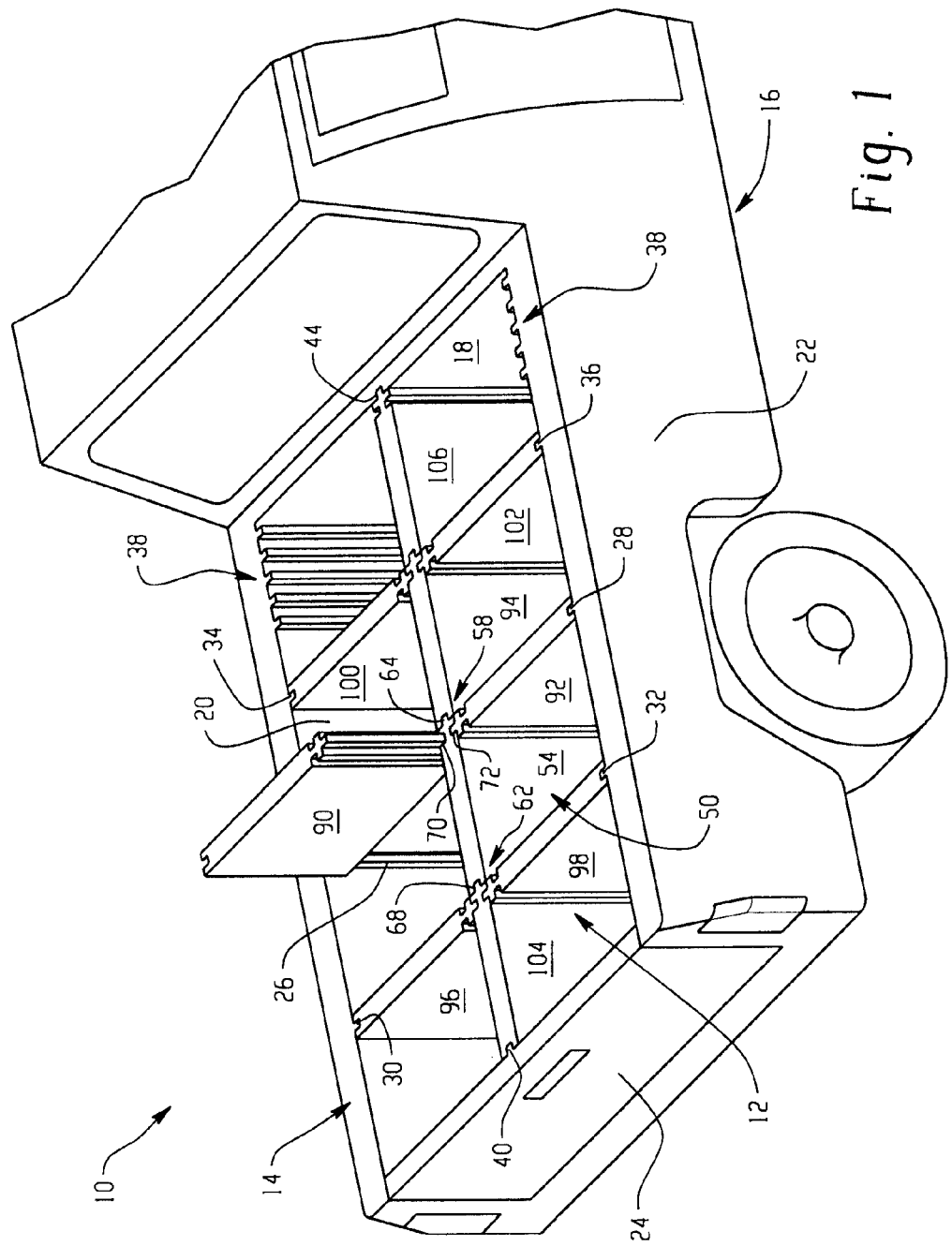
FIG. 1 is a perspective view of the rear of a vehicle having a cargo area with a divider assembly.

Referring now to the drawings, wherein the showings are for purposes of illustrating one or more exemplary embodiments and not for purposes of limiting same, FIG. 1 illustrates an exemplary vehicle cargo area divider assembly generally designated by reference 10. As will be described in more detail below, the cargo area divider assembly 10 has a plurality of matching partition members 12 for dividing a vehicle cargo area 14 of a vehicle 16. The illustrated vehicle 16 is a pickup truck having a cargo area defining the vehicle cargo area. It is to be understood and appreciated by those skilled in the art that the invention is not so limited and could be applied to cargo areas in other vehicles (e.g., a cargo area in a SUV, mini-van, station wagon). As is known, the vehicle cargo area 14 can be used to transport cargo items of various sizes.

The vehicle cargo area 14 can have a plurality of walls defining at least one projection and at least one groove. More particularly, the plurality of walls can include a forward wall 18, a pair of laterally spaced apart sidewalls 20, 22 extending rearwardly from the forward wall 18. The depicted cargo area 14 also includes a rear wall 24 that can be configured as an openable tailgate. The at least one wall projection can include, for example, a first sidewall projection 26 on the first sidewall 20 and a second sidewall projection 28 on the second sidewall 22 of the spaced apart sidewalls 20, 22. As shown, the first and second sidewall projections 26, 28 are aligned with one another along the sidewalls 20, 22 so as to extend toward one another to form a first set of sidewall projections.

In the illustrated embodiment, the sidewalls 20, 22 include additional sidewall projections. More specifically, the sidewalls 20, 22 include a second set of aligned sidewall projections 30, 32 and a third set of aligned sidewall projections 34, 36. In the illustrated embodiment, the sets of sidewall projections 26, 28; 30, 32; and 34, 36 are longitudinally spaced apart along the sidewalls 20, 22. While in the illustrated embodiment the longitudinal spacing between adjacent sets of sidewall projections and the longitudinal spacing of the sets of sidewall projections 30, 32 and 34, 36, respectively, from the front and rear walls is approximately the same, it is to be appreciated that other spacing arrangements could be employed and/or the number of sets provided could be more or less than shown in the illustrated embodiment.

Additional sets 38 of opposed sidewall projections can be provided adjacent a longitudinal end wall, such as forward wall 18, for storing the plurality of partition members 12 adjacent the end wall as will be described in more detail below. As shown, these additional sets of sidewall projections 38 can be relatively closely spaced compared to the sets of sidewall projections 26, 28; 30, 32; and 34, 36 for compact storage of the partition members 12. Again, more or less additional sets of sidewall projections 38 could be used than illustrated. In one arrangement, the additional sets of projections 38 provided on the sidewalls 20, 22 adjacent the end wall (e.g., forward wall 18) for compact partition storage correspond in number to the number of projection sets provided elsewhere on the sidewalls.

The wall projections can additionally include a projection in one of the longitudinal end walls (i.e., forward wall 18 or rear wall/tailgate 24) and a wall groove in the other of the longitudinal end walls opposite the projection. In the illustrated embodiment, a wall projection 40 extends from the rear wall 24 at a central location (i.e., centrally located between the sidewalls 20, 22) and a wall groove 44 is defined in the forward wall 18 at a central location for alignment with the rear wall projection 40. It is to be appreciated that the projection 40 and groove 44 could be reversed from the illustrated embodiment with the projection located on the forward wall 18 and the groove on the rear wall 24, though some longitudinal adjustment of the sidewall projections 26-38 may be needed. Also, it is to be appreciated that additional projections and grooves could be provided in the forward and rear walls 18, 24 to allow for further lateral partitioning and/or to accommodate varying cargo area widths.

Figure 2:
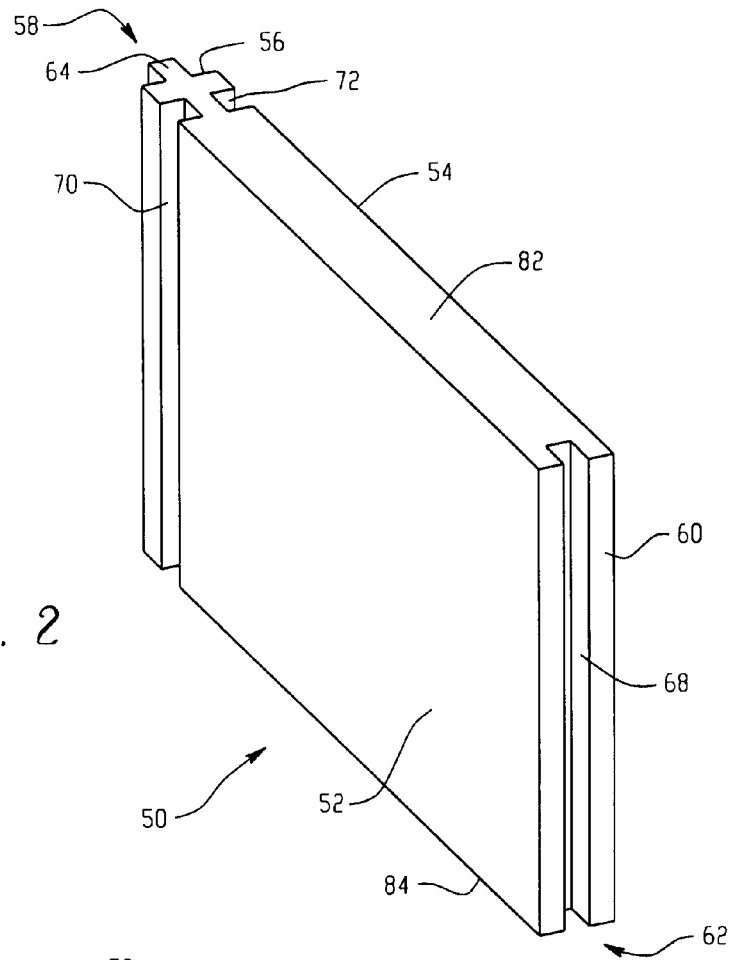
FIG. 2 is a perspective view of a partition member of the vehicle cargo area divider assembly of FIG. 1.
Figure 3:
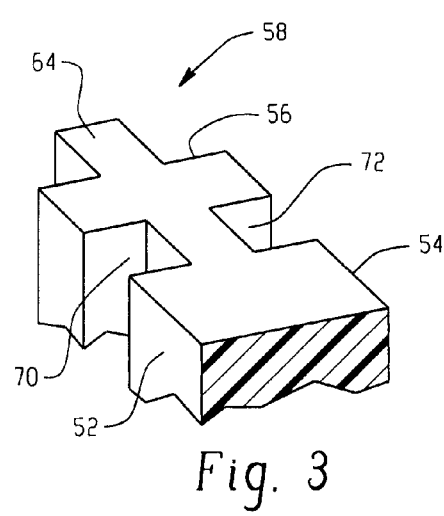
FIG. 3 is a partial perspective view of a first end of the partition member of FIG. 2.
Figure 4:
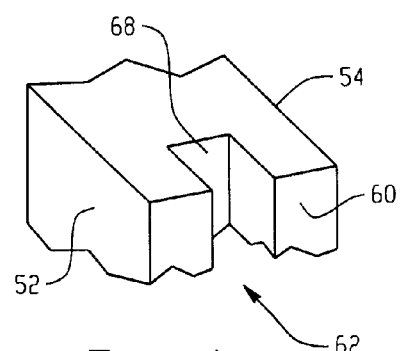
FIG. 4 is a partial perspective view of a second end of the partition member of FIG. 2.

As will be described in more detail below, the plurality of partition members 12 each have a first end and a second end. The first end of the partition member defines a first end projection and at least one first end groove orthogonally oriented relative to the projection. The second end of the partition member defines a second end groove. More particularly, with additional reference to FIG. 2, a first partition member 50 of the plurality of matching partition members 12 is shown for the cargo area divider assembly 10. The illustrated first partition member 50 has a first partition side 52 and a second partition side 54. The first partition member 50 also has a first end surface 56 extending between the first partition side 52 and the second partition side 54 at a first end 58 of the first partition member 50 and a second end surface 60 extending between the first partition side 52 and the second partition side 54 at a second end 62 of the first partition member 50.

The first end 58 defines a first end projection 64 and at least one first end groove orthogonally oriented relative to the projection 64. In particular, the projection 64 extends from the first end surface 56. The first end projection 64 of the first partition member 50 is alternately receivable in a wall groove (e.g., the wall groove 44 in front wall 18), in a first end groove of another partition member, or in a second end groove of another partition member. In the illustrated embodiments, the first end projection 64 is received in a corresponding groove (i.e., a wall groove or a groove of another partition member) in the manner of a tongue and groove connection.

The second end 62 defines a second end groove 68. In particular, the second end groove 68 is defined in the second end surface 60 of the first partition member 50. The first end projection 64 has a length that is orthogonally oriented relative to the first end surface 56. The second end groove 68 has a depth that is orthogonally oriented relative to the second end surface 60 and generally parallel to the length of the first end projection 64. The second end groove 68 of the first partition member 50 alternately receives a wall projection on one of the walls of the cargo area 14 or the first end projection of another partition member.

The at least one first end groove of the first partition member 50 receives a first end projection of at least one other partition member as will be described hereinbelow. In the illustrated embodiment, the at least one first end groove of the first partition member 50 includes a pair of first end grooves 70, 72 that are respectively defined in the first and second partition sides 52, 54 of the first partition member 50 adjacent the first end surface 56 thereof. In particular, the first side groove 70 is defined in the first partition side 52 and second side groove 72 is defined in the second, opposite partition side 54. A depth of each of the pair of grooves 70, 72 is oriented approximately perpendicularly relative to the length of the first end projection 64 and is approximately parallel relative to the first end surface 56. In the illustrated embodiment, the first end projection 64 of the first partition member 50, the first side groove 70 of the first partition member 50 and the second side groove 72 of the first partition member 50 are together arranged in, or together define, a cross-shaped formation or profile at the first end 58 of the first partition member 50.

In use, the first end projection 64 of the first partition member 50 is alternately receivable in the wall groove 44 of the forward wall 18 (an end wall of the vehicle cargo area 14) to laterally partition the vehicle cargo area 14; a second end groove of another partition member of the plurality of partition members to laterally partition the vehicle cargo area 14, or in a first end groove of another partition member of the plurality of partition members 12 to longitudinally partition the vehicle cargo area 14. The second end groove 68 of the first partition member 50 alternately receives the projection of the rear wall 24 (i.e., an end wall of the vehicle cargo area) when laterally partitioning the vehicle cargo area 14, a first end projection of another partition member when laterally partitioning the vehicle cargo area 14, or a projection of a side wall of the vehicle cargo area 14 when longitudinally partitioning the vehicle cargo area 14 or being stored adjacent an end wall, such as forward wall 18.

In the illustrated embodiment, each of the first end projection 58, the first end grooves 70, 72 and the second end groove 68 extend along an entire height of the partition member 50. The entire height can be defined as a dimension between an upper surface 82 of the first partition member 50 and a lower surface 84 of the partition member 50. The upper surface 82 extends between the first and second partition sides 52, 54 and the first and second partition ends 58 and 62. Likewise, the lower surface 84 extends between the first and second partition sides 52, 54 and between the first and second partition ends 58 and 62. It is to be appreciated by those skilled in the art that this arrangement is not required. That is, alternate projection and groove configurations than those illustrated herein can be employed with the plurality of matching partition members 12.

The plurality of partition members 12 of the illustrated embodiment includes a second partition member 90 and a third partition member 92. The first end projection of the first partition member 90 is received in the first side groove 70 of the first partition member 50 and the first end projection of the third partition member 92 is received in the second side groove 72 of the first partition member 50. The side wall projection 26 is received in the second end groove of the second partition member 90 and the side wall projection 28 is received in the second end groove of the third partition member 92. In this configuration, the second and third partition members 90, 92 extend laterally from the first side wall 20 to the second side wall 22 to longitudinally partition the vehicle cargo area 14. The plurality of partition members 12 of the illustrated embodiment can additionally include partition members 94, 96, 98, 100, 102, 104 and 106, though more or less partition members could be provided.

Also, in the illustrated embodiment, the plurality of partition members 12 includes at least two laterally extending partition members (e.g., partition members 90 and 92) and at least two longitudinally extended partition members (e.g., partition member 50 and partition member 104). As already discussed in reference to the partition members 90 and 92, the first end projection of one of the at least two laterally extending partition members (e.g., partition member 90) is received in the at least one first end groove of one of the longitudinally extending partition members (e.g., partition member 50) and the first end projection of another of the at least two laterally extending partition members (e.g., partition member 92) is received in the at least one first end groove of the same one of the longitudinally extending partition members (e.g., partition member 50).

As shown, the first end projection of one of the longitudinally extending partition members (e.g., partition member 104) is received in the second end groove 68 of another of the longitudinally extended partition members (e.g., second end groove 68 of partition member 50). As already mentioned, each of the plurality of partition members 12 can be structurally identical to one another, including partition members 50 and 90-106. In this arrangement, the projections 26, 28 are received in the second end grooves of the at least two laterally extending partition members, i.e., partition members 90, 92. In some vehicle cargo areas (not the vehicle cargo area 14 of the illustrated embodiment), the partition members 50, 90, 92 and 94 could be sufficient for dividing the cargo area into sub-compartments. However, the vehicle cargo area 14 of the illustrated embodiment can further employ the laterally extending partition members 96, 98, 100, 102 and longitudinally extending partition members 104 and 106.

Since the partition members are structurally identical, it is to be appreciated that any of the partition members can be used in any of the positions in the vehicle cargo area 14. That is laterally extending partition members can be used in other laterally extending positions or can be used in longitudinally extending positions. Likewise, longitudinally extending partition members can be used in other longitudinally extending positions or in any of the illustrated laterally extending positions. Advantageously, the projection portion of any of the partition members 12 can be received in a corresponding groove of any of the other partition members or of a wall of the vehicle cargo area 14. The at least one first end groove of the partition members, which in the illustrated embodiment includes grooves on both sides of the partition member, can receive at least one corresponding projection of another partition member. Also, the second end groove of each of the partition members 12 can receive at least one corresponding projection of another partition member or of the cargo area wall, such as projection 40 of the tailgate 24.

In operation, any of the partition members can have its first end projection slidably received within a groove of another partition member or of a groove of the vehicle cargo area 14. Likewise, the grooves of any of the partition members can be slid onto any of the projections of another partition member or of the vehicle cargo area. For example, partition member 90 is shown being inserted into (or removed from) the vehicle cargo area 14. The first end projection of the partition member 90 is being slidably received within the first side groove 70 and the second end groove of the partition member 90 is sliding about projection 30. While the plurality of partition members 12 are illustrated in FIG. 1 as being fully employed throughout the vehicle cargo area 14, it is to be appreciated that a lesser number of partition members could be used at any given time. For example, partition members 96, 98 and 104 could be used to partition a back portion of the vehicle cargo area 14 adjacent the tailgate 24 without having other of the partition members dividing up the vehicle cargo area 14. In another example, the partition members 50, 90, 96 and 104 could partition a back corner of the vehicle cargo area 14. In still another example, the partition members 96, 98 and 104 could partition the back of the vehicle cargo area 14 while partition members 100, 102 and 106 partition a forward portion of the vehicle cargo area. Of course, further partition arrangements are possible, the foregoing being merely illustrative that many combinations are possible.

Figure 5:
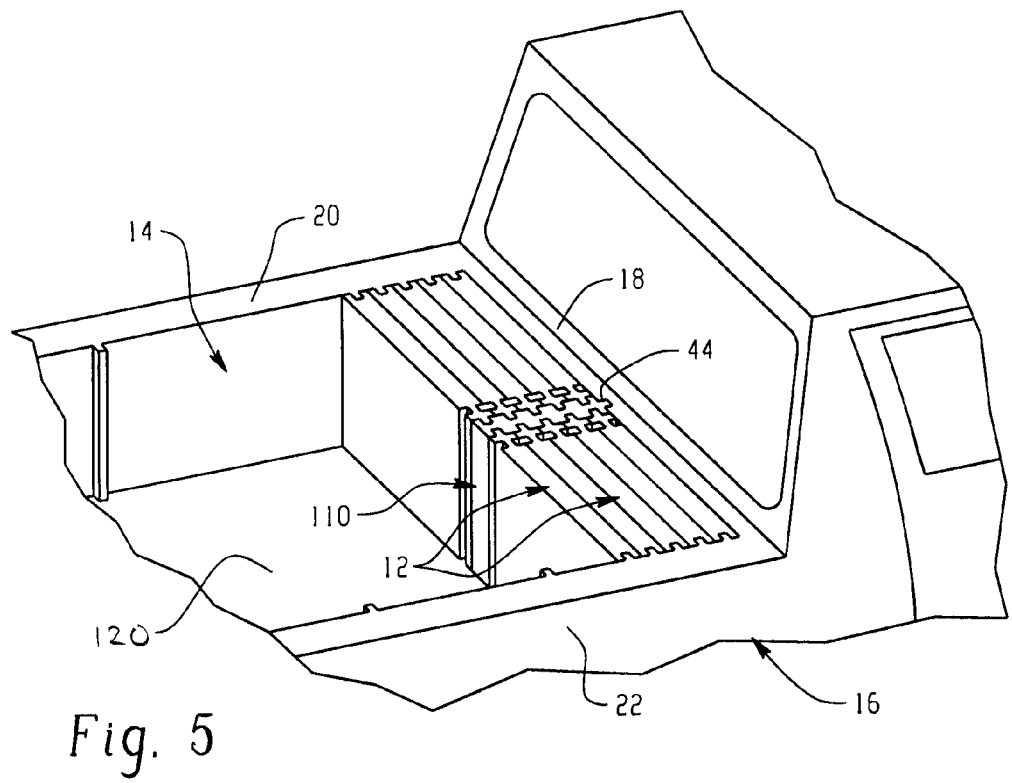
FIG. 5 is a partial perspective view of a vehicle showing the cargo area divider assembly in a stowed state held in place by a storage member.
Figure 6:
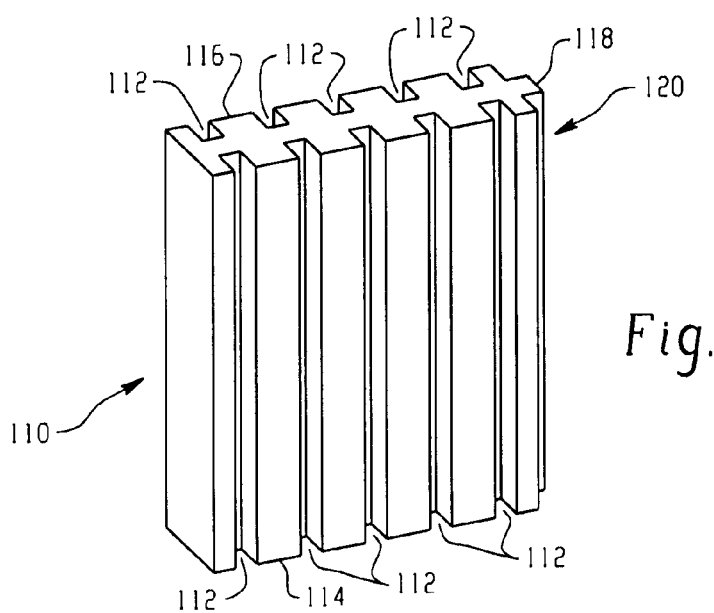
FIG. 6 is a perspective view of the storage member.

With additional reference to FIGS. 5 and 6, when any one or more of the plurality of partition members 12 are not in use dividing the vehicle cargo area 14, they can be stored, if desired. More particularly, the vehicle divider assembly 10 can further include a storage member 110 that has a plurality of grooves 112 defined in side surfaces 114, 116 for receiving first end projections of the plurality of partition members 12, particularly when stored tightly adjacent a longitudinal end wall, such as forward wall 18. The storage member 110 can additionally include a projection or projection portion 118 extending from a forward end 120 of the storage member 110, which can be received in the vehicle cargo area groove 44 defined in the forward wall 18. The sets of projections 38 disposed along the side walls 20, 22 closely adjacent to forward wall 18 can be provided in association with the storage member 110. In particular, as shown in FIG. 5, the plurality of partition members 12 can be stowed as illustrated. In particular, second end grooves of the plurality of partition members 12 can receive the closely spaced projections 38 of the side walls 20, 22 and the grooves 112 of the storage member 110 can receive first end projections of the plurality of partition members 12. By this arrangement, the plurality of partition members are conveniently locked in place adjacent the forward wall 18, which allows the remainder of the vehicle cargo area 14 to be used for hauling or carrying other items (e.g., larger or bulk items).

Figure 7:
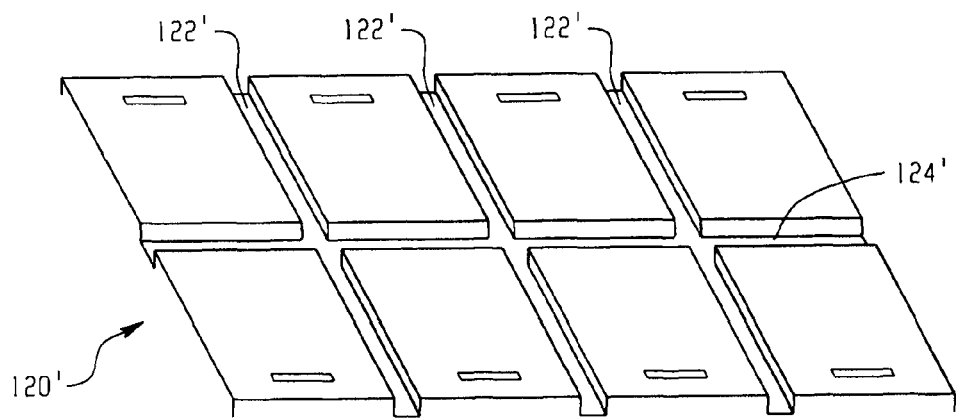
FIG. 7 is a schematic view of a vehicle cargo area having a plurality of storage compartments with movable covers forming part of a cargo area floor.

While not shown in FIG. 5, a floor of a vehicle cargo area 14 can have laterally and longitudinally extending slots for receiving the plurality of partition members when deployed in the vehicle cargo area 14 for partitioning thereof. More specifically, with additional reference to FIG. 7, a cargo area floor 120' having at least one laterally extending slot and at least one longitudinally extending slot is shown for receiving the plurality of partition members 12 according to an exemplary embodiment. In particular, the illustrated cargo area floor 120' has laterally extending slots 122' (three in FIG. 7) that would extend from one side wall of the cargo area to the other side wall of the cargo area, and has a single longitudinally extending slot 124' that would extend from a forward wall of the cargo area to the tailgate of the cargo area. Though not shown, but will be understood and appreciated by those skilled in the art, the laterally and longitudinally extending slots 122', 124' can be aligned with or in registry with the projections and the cargo area groove. In particular, the laterally extending slots 122' can be aligned with the laterally spaced apart projections of the vehicle cargo area and the longitudinal slot 124' can be aligned with the forward wall groove and the tailgate projection. The slots 122', 124' can be advantageously used to impart stability to the partition members when deployed throughout the cargo area.

Figure 8:
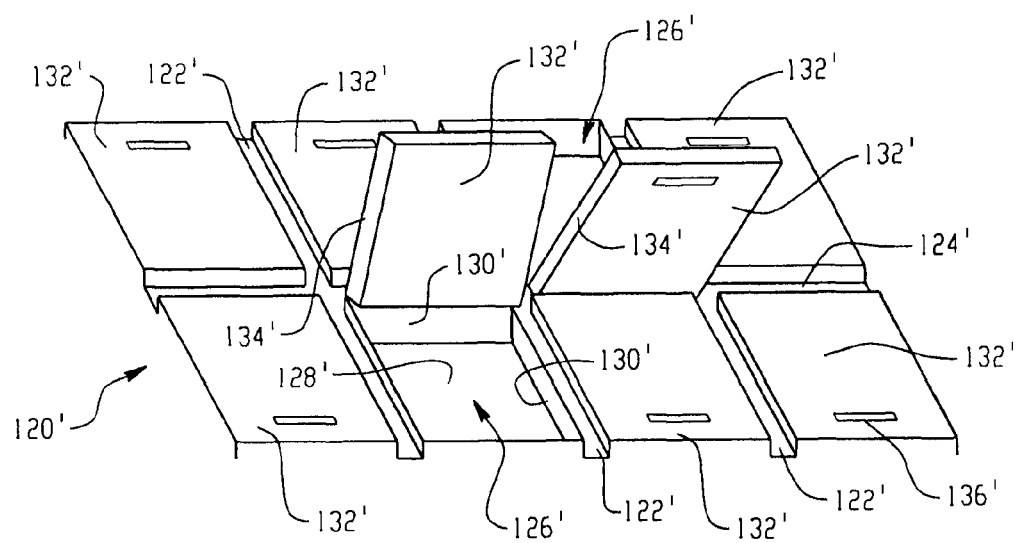
FIG. 8 is another schematic view of the cargo area floor of FIG. 7 showing a couple of the movable covers in an open position.

With additional reference to FIG. 8, the cargo area floor 120' can be provided with one or more under floor storage compartments 126'. The plurality of storage compartments 126' are disposed beneath the cargo area floor. In the illustrated embodiment of FIG. 8, each compartment has a cargo area defined by a floor 128' and side walls 130'. However, it is contemplated that one or more of the side walls 130' (or portions thereof) could be removed so that adjacent storage compartments could share a common storage area. In any case, as shown, each of the plurality of storage compartments 126' can have a movable cover 132', the covers 132' collectively forming the cargo area floor 120'. As shown, the laterally and longitudinally extending slots 122', 124' can be defined by the walls 130' separating the plurality of storage compartments 126' and edge surfaces (e.g., edge surfaces 134') of the movable covers 132'. For ease of use, the movable covers 132' can include handles 136' provided on an upper surface thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle cargo area divider assembly, comprising:
a vehicle cargo area having a plurality of walls defining at least one wall projection and at least one wall groove;
a plurality of partition members each having a first end defining a first end projection and at least one first end groove orthogonally oriented relative to said projection, and having a second end defining a second end groove, said first end projection of a first partition member of said plurality of partition members alternately receivable in said at least one wall groove, in said at least one first end groove of at least one other partition member of said plurality of partition members, or in said second end groove of said at least one other partition member.

2. The vehicle cargo area divider assembly of claim 1 wherein said second end groove of said first partition member alternately receives said at least one wall projection or said first end projection of said at least one other partition member.

3. The vehicle cargo area divider assembly of claim 1 wherein said at least one first end groove of said first partition member receives said first end projection of said at least one other partition member.

4. The vehicle cargo area divider assembly of claim 3 wherein said at least one first end groove of said first partition member includes a first side groove defined in a first partition side and a second side groove defined in a second, opposite partition side.

5. The vehicle cargo area divider assembly of claim 4 wherein said at least one other partition member includes a second partition member and a third partition member, said first end projection of said second partition member received in said first side groove of said first partition member and said first end projection of said third partition member received in said second side groove of said second partition member.

6. The vehicle cargo area divider assembly of claim 5 wherein said cargo area walls include spaced apart sidewalls and said at least one wall projection includes a first sidewall projection on a first sidewall of said spaced apart sidewalls and a second sidewall projection on a second sidewall of said spaced apart sidewalls, said first and second sidewall projections aligned with one another along said spaced apart sidewalls, said first sidewall projection received in said second end groove of said second partition member and said second sidewall projection received in said second end groove of said third partition member, and said second and third partition members extending laterally from said first sidewall to said second sidewall.

7. The vehicle cargo area divider assembly of claim 4 wherein said first end projection of said first partition member, said first side groove of said first partition member and said second side groove of said first partition member are together arranged in a cross-shaped formation at said first end of said first partition member.

8. The vehicle cargo area divider assembly of claim 1 wherein said plurality of partition members include at least two laterally extending partition members and at least two longitudinally extending partition members, said first end projection of one of said longitudinally extending partition members received in said second end groove of another of said longitudinally extending partition members, said first end projection of one of said at least two laterally extending partition members received in said at least one first end groove of said one of said longitudinally extending partition members and said first end projection of another of said at least two laterally extending partition members received in said at least one first end groove of said one of said longitudinally extending partition members, each of said plurality of partition members structurally identical to one another.

9. The vehicle cargo area divider assembly of claim 8 wherein two of said at least two laterally extending partition members extend laterally across said vehicle cargo area from a first sidewall of said plurality of cargo area walls to a second sidewall of said plurality of cargo area walls, said at least one wall projection including sets of opposed projections extending toward one another from said first and second sidewalls for receipt in said second end grooves of said at least two laterally extending partition members.

10. The vehicle cargo area divider assembly of claim 9 wherein said sets of opposed projections include a plurality of closely spaced projections adjacent a longitudinal end wall of said plurality of cargo area walls for storing said plurality of partition members tightly adjacent said longitudinal end wall.

11. The vehicle cargo area divider assembly of claim 10 further including a storage member having a plurality of grooves for receiving said first end projections of said plurality of partition members when stored tightly adjacent said longitudinal end wall.

12. The vehicle cargo area divider assembly of claim 1 wherein said vehicle cargo area includes a cargo area floor having at least one laterally extending slot and at least one longitudinally extending slot for receiving said plurality of partition members, said at least one laterally extending slot orthogonally oriented relative to said at least one longitudinally extending slot.

13. The vehicle cargo area divider assembly of claim 12 wherein a plurality of storage compartments are disposed beneath the cargo area floor, each of said plurality of storage compartments having a movable cover that forms said cargo area floor, said laterally and longitudinally extending slots defined by walls separating said plurality of storage compartments and edge surfaces of said movable covers.

14. A partition member for a vehicle cargo area divider assembly, comprising:
   a first end defining a first end projection portion and at least one first end groove orthogonally oriented relative to said projection portion; and
   a second end defining a second end groove, said projection portion received in a corresponding groove of another partition member or of a vertical wall of an associated vehicle cargo area, said at least one first end groove receiving at least one corresponding projection of another partition member, and said second end groove receiving at least one corresponding projection of another partition member or of the vertical cargo area wall.

15. The partition member of claim 14 further including a first partition side and a second, opposite partition side, said at least one first end groove includes a first side groove defined in said first partition side and a second side groove defined in said second partition side.

16. The partition member of claim 15 wherein said first end projection portion, said first side groove and said second side groove together define a cross-shaped profile at said first end.

17. The partition member of claim 14 wherein each of said first end projection portion, said at least one first end groove, and said second end groove extend along an entire height of the partition member.

18. The vehicle cargo area divider assembly of claim 1 wherein the plurality of partition members are matching partition members, each partition member comprising:
   a first partition side and a second partition side, a first end surface extending between said first partition side and said second partition side at said first end and a second end surface extending between said first partition side and said second partition side at said second end;
   said first end projection extends from said first end surface;
   said at least one first end groove includes a pair of first end grooves respectively defined in said first and second partition sides adjacent said first end surface, a depth of each of said pair of grooves oriented approximately perpendicularly relative to a length of said first end projection; and
   said second end groove defined in said second end surface, a depth of said second end groove generally parallel to said length of said first end projection.

19. The vehicle cargo area divider assembly of claim 18 wherein said first end projection of one partition member of the plurality of partition members is alternately receivable in a wall groove of an end wall of the vehicle cargo area to laterally partition the vehicle cargo area, said second end groove of another partition member of the plurality of partition members to laterally partition the vehicle cargo area, or in one of said pair of first end grooves of another partition member of the plurality of partition members to longitudinally partition the vehicle cargo area.

20. The vehicle cargo area divider assembly of claim 18 wherein said second end groove of one partition member of the plurality of partition members alternately receives a wall projection of an end wall of the vehicle cargo area when laterally partitioning the vehicle cargo area, said first end projection of another partition member of the plurality of partition members when laterally partitioning the vehicle cargo area, or a wall projection of a sidewall of the vehicle cargo area when longitudinally partitioning the vehicle cargo area or being stored adjacent an end wall.

* * * * *